United States Patent
Nogo et al.

(10) Patent No.: US 8,045,050 B2
(45) Date of Patent: Oct. 25, 2011

(54) PRINTING SYSTEM HAVING A CRADLE MOUNTED TO A PRINTER AND A CAMERA MOUNTED TO THE CRADLE

(75) Inventors: Yuichiro Nogo, Tokyo (JP); Yoichi Miyajima, Tokyo (JP); Masatsugu Honma, Kanagawa (JP)

(73) Assignee: Sony Corporation, Tokyo (JP)

( * ) Notice: Subject to any disclaimer, the term of this patent is extended or adjusted under 35 U.S.C. 154(b) by 651 days.

(21) Appl. No.: 11/300,312

(22) Filed: Dec. 15, 2005

(65) Prior Publication Data

US 2006/0132609 A1 Jun. 22, 2006

(30) Foreign Application Priority Data

Dec. 20, 2004 (JP) ................................ P2004-368317

(51) Int. Cl.
*H04N 5/225* (2006.01)
*H04N 5/222* (2006.01)

(52) U.S. Cl. ............... 348/373; 348/375; 348/207.2; 348/333.07

(58) Field of Classification Search ............ 348/207.2, 348/373, 375, 333.07
See application file for complete search history.

(56) References Cited

U.S. PATENT DOCUMENTS

| | | | | |
|---|---|---|---|---|
| 6,693,665 B1 * | 2/2004 | Shindo et al. | ............... | 348/207.2 |
| 6,721,001 B1 * | 4/2004 | Berstis | ....................... | 348/231.3 |
| 7,075,579 B2 * | 7/2006 | Whitby et al. | ................. | 348/375 |
| 7,170,557 B2 * | 1/2007 | Manico et al. | ........... | 348/333.07 |
| 7,212,229 B2 * | 5/2007 | Parulski et al. | ............ | 348/207.2 |
| 7,411,608 B1 * | 8/2008 | Moskaluk et al. | .......... | 348/207.2 |
| 2002/0071035 A1 * | 6/2002 | Sobol | ............................ | 348/207 |
| 2002/0149695 A1 * | 10/2002 | Kayanuma | .................... | 348/375 |
| 2003/0053124 A1 * | 3/2003 | Iijima et al. | .................. | 358/1.15 |
| 2003/0156200 A1 * | 8/2003 | Romano et al. | .......... | 348/207.99 |
| 2004/0046867 A1 * | 3/2004 | Silverbrook et al. | ....... | 348/207.2 |
| 2004/0212822 A1 * | 10/2004 | Schinner | ...................... | 358/1.15 |

FOREIGN PATENT DOCUMENTS

| | | |
|---|---|---|
| JP | 2000-036931 | 2/2000 |
| JP | 2002-354310 | 12/2002 |
| JP | 3446374 | 7/2003 |
| JP | 2004-122482 | 4/2004 |

OTHER PUBLICATIONS

Office Action for Japanese Patent Application No. 2004-368317, dated Apr. 21, 2009.

* cited by examiner

*Primary Examiner* — Lin Ye
*Assistant Examiner* — Mekonnen Dagnew
(74) *Attorney, Agent, or Firm* — Finnegan, Henderson, Farabow, Garrett & Dunner, L.L.P.

(57) ABSTRACT

A cradle device on which a camera device is mounted can be mounted on a printer device. There is provided a printing system that includes a camera device having an imaging unit and a memory for storing image data photographed by the imaging unit, a cradle device having a camera mounting section mounted in the state that the camera device is electrically connected and a terminal unit or an operating unit that is provided on the back surface and is electrically connected to other electronic devices, and a printer device that has a cradle mounting section mounted in the state that the cradle device is electrically connected and prints image data inputted from the cradle device, wherein the cradle mounting section has a covering portion that covers the terminal unit or the operating unit provided on the back surface of the cradle device.

5 Claims, 5 Drawing Sheets

PRINTING SYSTEM HAVING A CRADLE MOUNTED TO A PRINTER AND A CAMERA MOUNTED TO THE CRADLE

CROSS REFERENCES TO RELATED APPLICATIONS

The present invention contains subject matter related to Japanese Patent Application JP 2004-368317 filed in the Japanese Patent Office on Dec. 20, 2004, the entire contents of which being incorporated herein by reference.

BACKGROUND OF THE INVENTION

1. Field of the Invention

The present invention relates to a printing system which can mount a camera device on a printer device through a cradle device.

2. Description of the Related Art

As shown in Patent Document 1 (Japanese Patent No. 3446374), there has been a system which can mount a camera device is directly on a printer device and image data of the camera device is printed by the printer device. Further, a small camera device, such as a digital still camera can be mounted on a cradle device. For example, when a small camera device is mounted on a cradle device, a charge type battery built in the camera device can be charged. Further, the camera device can exchange data by wire with other electronic devices.

SUMMARY OF THE INVENTION

The present invention is made in view of the above-mentioned problems, and it is desirable to provide a novel printing system which can mount a cradle device to be mounted with a camera device on a printer device.

It is also desirable to provide a printing system which can mount the cradle device on the printer device with good appearance.

Further, it is also desirable to provide a printing system which, when the camera device is mounted on the printer device through the cradle device, data of the camera device can be printed by the printer device to improve the convenience.

The printing system according to the present invention includes a camera device having an imaging unit and a memory for storing image data photographed by the imaging unit, a cradle device having a camera mounting section that the camera device is mounted in the state that the camera device is electrically connected and a terminal unit or an operating unit that is provided on the back surface and is electrically connected to other electronic devices, and a printer device that has a cradle mounting section mounted in the state that the cradle device is electrically connected and prints image data inputted from the cradle device. The cradle mounting section has a covering portion that covers the terminal unit or the operating unit provided on the back surface of the cradle device.

According to the present invention, the camera device is mounted on the cradle device and electrically connected to the cradle device. Further, the cradle device is mounted on the printer device and electrically connected to the printer device. Thus, the image data stored in the camera device can be printed by the printer device and the convenience can be improved.

Further, the covering portion is provided in the cradle mounting section of the printer device. When the cradle device is mounted on the cradle mounting section, the terminal unit and the operating unit provided on the back surface of the cradle device can be concealed. Thus, the deterioration of the appearance can be prevented.

DETAILED DESCRIPTION OF THE PREFERRED EMBODIMENTS

A printing system to which the present invention is applied will be hereinafter described with reference to the drawings.

Figure 1:
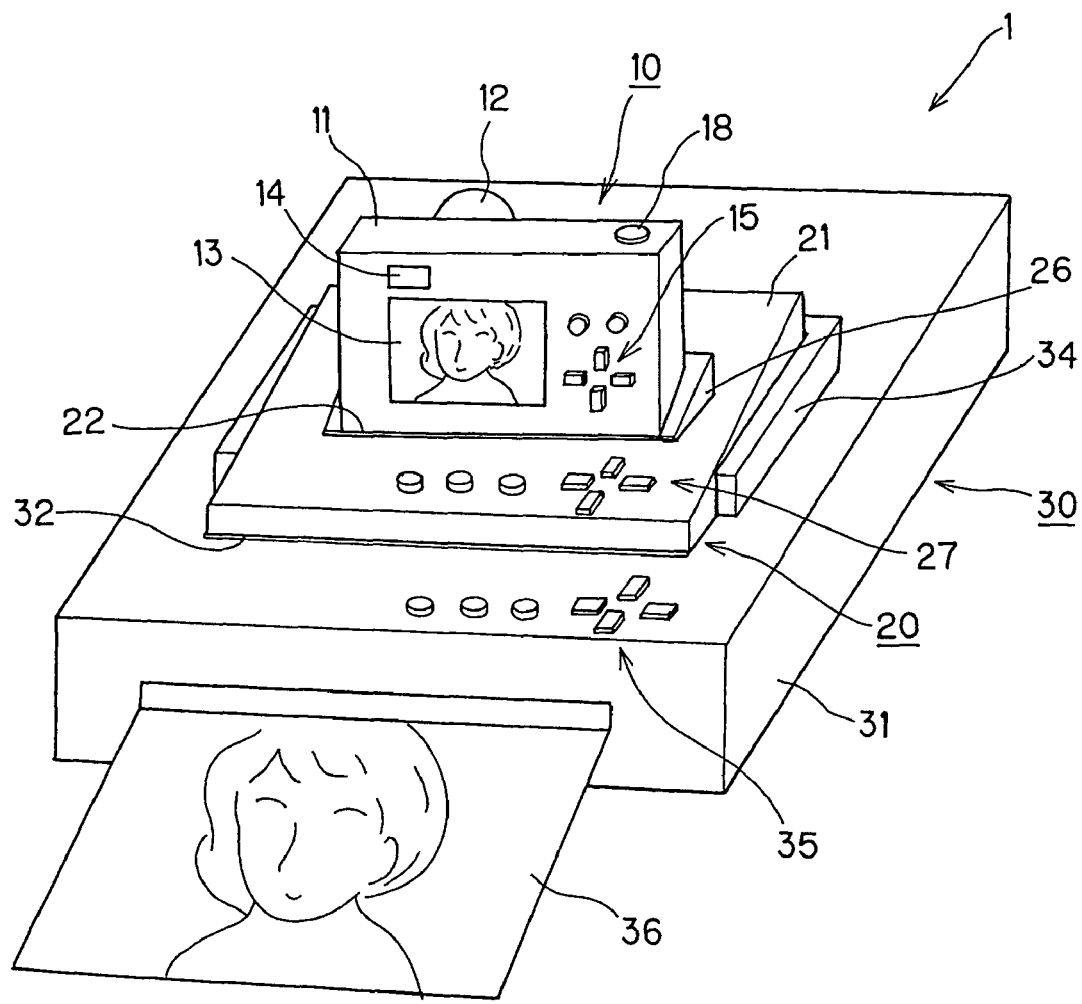
FIG. 1 is a perspective view of a printing system according to the present invention.

As shown in FIG. 1, a printing system 1 according to the present invention includes a digital still camera 10, a cradle device 20 on which the digital still camera 10 is mounted, and a printer device 30 on which the cradle device 20 is mounted.

Figure 2:
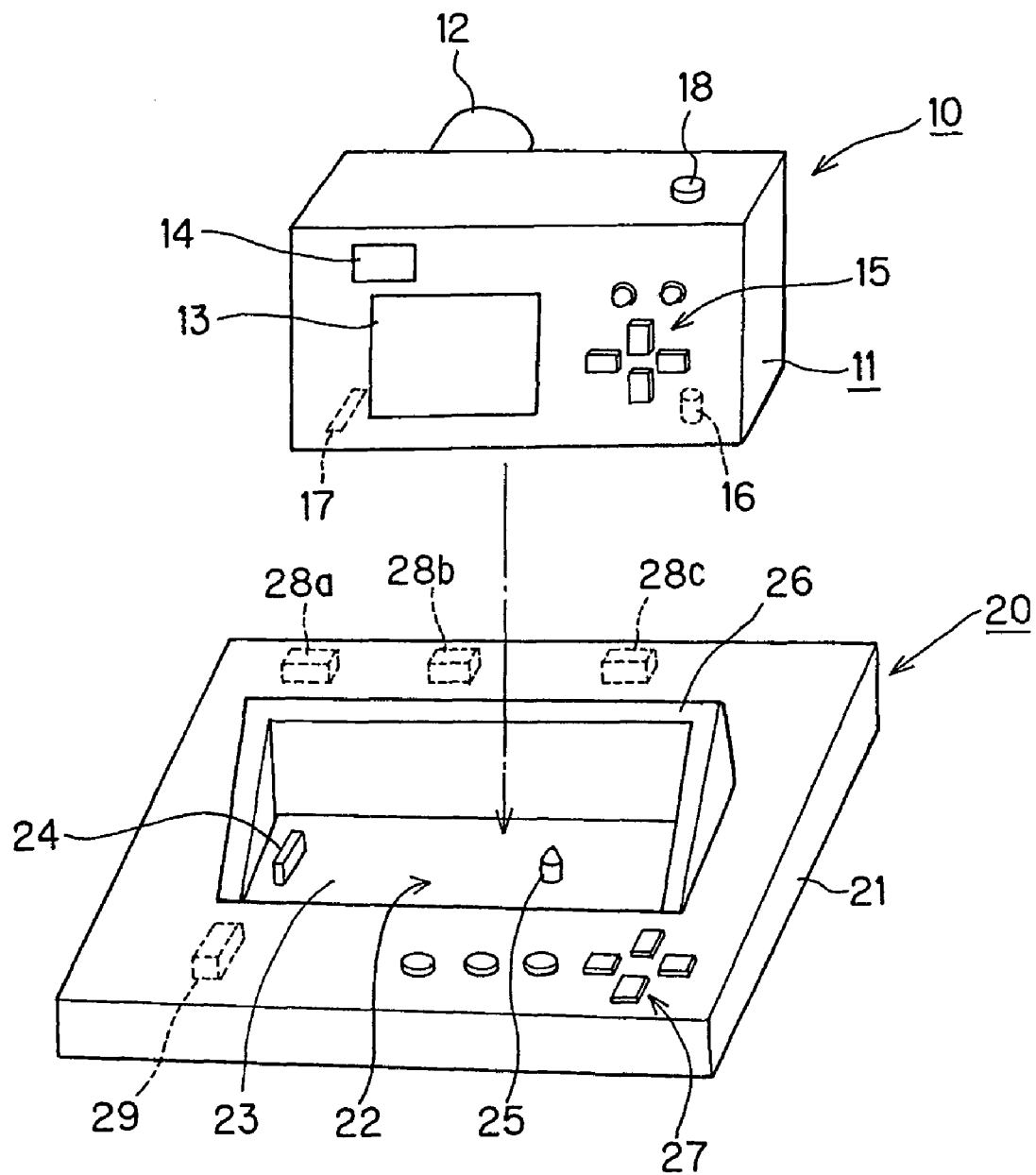
FIG. 2 is a perspective view of a digital still camera and a cradle device that constitute the printing system.

The digital still camera 10 has, as shown in FIG. 1 and FIG. 2, a camera body 11 formed in a substantially rectangular shape. In the camera body 11, a control circuit substrate in which various electric circuits for realizing a camera function are assembled is incorporated, and a charge type battery is arranged. An imaging unit 12 constituted by imaging elements such as a plurality of lenses, a CCD (Charge-Coupled Device) element, a CMOS (Complementary Metal-Oxide Semiconductor) is provided on the front surface of the camera body 11. Moreover, a shutter button 18 is provided on the upper surface of the camera body 11. Also, a display unit 13 is provided on the back surface of the camera body 11. The display unit 13 is formed, for example, in a substantially rectangular shape. The display unit 13 is formed of a display element such as an LCD (Liquid Crystal Display), an organic EL display (Organic Electroluminescence Display). A viewfinder 14 for defining a photographing range is provided at the upper side of the display unit 13. Further, an operating unit 15 having a plurality of operating buttons is provided adjacent to the display unit 13 on the back surface of the camera body 11. The operating unit 15 can operate to display image data stored, for example, in an internal memory on the display unit 13. The operating unit 15 can set a detailed setup of the digital still camera 10, for example, on and off of a flash.

Further, a mounting hole 16 in which a tripod or the like is mounted is provided at the bottom of the camera body 11. In the mounting hole 16, an accessory such a tripod is mounted. In addition, when the camera body 11 is mounted on the cradle device 20, the mounting hole 16 becomes a hole to be engaged with a positioning projection formed on the camera mounting section of the cradle device 20. Further, a jack 17 for electrically connecting the cradle device 20 is provided at the bottom of the cameral body 11. A power for charging is supplied from the jack 17 and the image data stored in the memory of the camera body 11 can be outputted to the cradle device 20 side from the jack 17.

The digital still camera 10 constituted as described above can take a picture by pressing the shutter button 18 while observing the image displayed by the imaging unit 12 on the display unit 13. The digital still camera 10 can store the photographed image data in the internal memory and preserve the image data. Further, the digital still camera 10 can reproduce the image data stored in the memory on the display unit 13 by operating the operating unit 15. Incidentally, the memory may be a memory built in the camera body 11 or may be detachable from the camera body 11. The digital still camera 10 is grasped by a user and used at the photographing time. The digital still camera 10 is placed on the cradle device 20 when not used. Moreover, the digital still camera 10 can reproduce the image data preserved in the memory in the state that the digital still camera 10 is mounted on the cradle device 20 to show the image displayed on the display unit 13.

The cradle device 20 on which the digital still camera 10 is mounted as described above, has, as shown in FIG. 1 to FIG. 3, a cradle body 21 formed in a substantially rectangular shape. The cradle body 21 has a camera mounting section 22 corresponding to the outer shape of the bottom of the digital still camera 10, at the position deviated to the back surface side on the upper surface of the cradle body 21. The camera mounting section 22 is constituted by a recess corresponding to the shape of the bottom of the digital still camera 10.

The bottom 23 of the camera mounting section 22 is inclined to the upper side from the back surface of the cradle body 21 toward the front surface. Therefore, as shown in FIG. 1, when the digital still camera 10 is mounted at the camera mounting section 22 of the cradle device 20, the display unit 13 provided on the back surface of the camera body 11 is directed toward the front surface of the cradle device 20. Thus, the image displayed on the display unit 13 can be easily observed. In the camera mounting section 22, a connector 24 connected to a jack 17 provided at the bottom of the camera body 11 is provided. The connector 24 is electrically connected to the jack 17 of the digital still camera 10. Accordingly, power for charging is supplied to the digital still camera 10 and the image data is inputted from the digital still camera 10. An operation signal for operating the digital still camera 10 at the operating unit 27 is inputted to the digital still camera 10. A positioning projection 25 to be engaged with the mounting hole 16 formed at the bottom of the camera body 11 is formed at the bottom 23 of the camera mounting section 22.

On the camera mounting section 22 as described above, a supporting piece 26 for supporting the front surface side of the camera body 11 is formed at the back surface side of the cradle body 21 in a substantially U shape so as to abut on the front surface of the camera body 11 and the side surfaces adjacent to the front surface of the camera body 11. The supporting piece 26 supports the camera body 11 mounted obliquely at the camera mounting section 22 from the bottom side of the camera body 11 so that the display unit 13 faces upward.

The cradle body 21 has an operating surface at the front surface side of the camera mounting section 22. An operating unit 27 having a plurality of push buttons is provided on the operating surface. When the digital still camera 10 is mounted at the camera mounting section 22 and electrically connected, the operating unit 27 can perform substantially the same operation as the operating unit 15.

The cradle body 21 includes as follows. On the back surface of the cradle body 21, a first jack 28*a* connected with a connection cord which is connected to the display of the camera, a monitor, or the like and outputs AV data such as image data, a second jack 28*b* connected with a connection cord which is connected to an information processing unit such as a personal computer and outputs image data and the like, and a third jack 28*c* which receives a DC power are provided. Incidentally, a changeover switch or the like for switching input and output may be provided in addition to the jacks on the back surface of the cradle body 21. Further, a jack 29 for electrically connected with the printer device 30 and the cradle mounting section is provided at the bottom of the cradle body 21.

Incidentally, in the inside of the cradle body 21, a printed circuit board is contained. On the printed circuit board, a circuit for connecting the digital still camera 10 to the printer device 30, a charge control circuit for charging the battery of the digital still camera 10, and the like are incorporated.

The digital still camera 10 is to be mounted with the back surface provided with the display unit 13 of the digital still camera 10 at the front surface side of the camera mounting section 22 of the cradle device 20 and the imaging unit 12 at the back surface side. The camera mounting section 22 supports the front surface side of the digital still camera 10 by the supporting piece 26 provided to form a substantially U shape at the back surface side of the cradle body 21. In the state that the digital still camera 10 is mounted on the camera mounting section 22, the connector 24 provided at the camera mounting section 22 is electrically connected to the jack 17 provided at the bottom of the camera body 11. In the state that the digital still camera 10 is mounted at the cradle device 20, the battery can be charged by the DC power inputted from the third jack 28*c*, for example. In the state that the digital still camera 10 is mounted on the cradle device 20, the digital still camera 10 can display the image data stored in the memory built in the camera body 11 on the display unit 13. Further, the image data can be displayed on a monitor connected to the second jack 28*b* by the connection cord. The operation of the digital still camera 10 mounted on the cradle device 20 can be performed by using the operating unit 27 of the cradle device 20, in addition to the operating unit 15 of the digital still camera 10.

Incidentally, the camera mounting section 22 does not have a supporting piece for supporting the digital still camera 10 at the front surface side of the cradle device 20. Therefore, the removal of the digital still camera 10 is performed by tilting the digital still camera 10 to the front surface side of the cradle device 20.

As described above, when the image data stored in the memory of the digital still camera 10 is reproduced or printed, the image data is reproduced or printed in the state that the digital still camera 10 is mounted on the cradle device 20 in many cases. Thus, in the printing system 1, the cradle device 20 is mounted on the printer device 30. The image data stored in the memory of the digital still camera 10 is outputted to the printer device 30 and can be printed by the printer device 30.

Figure 3:
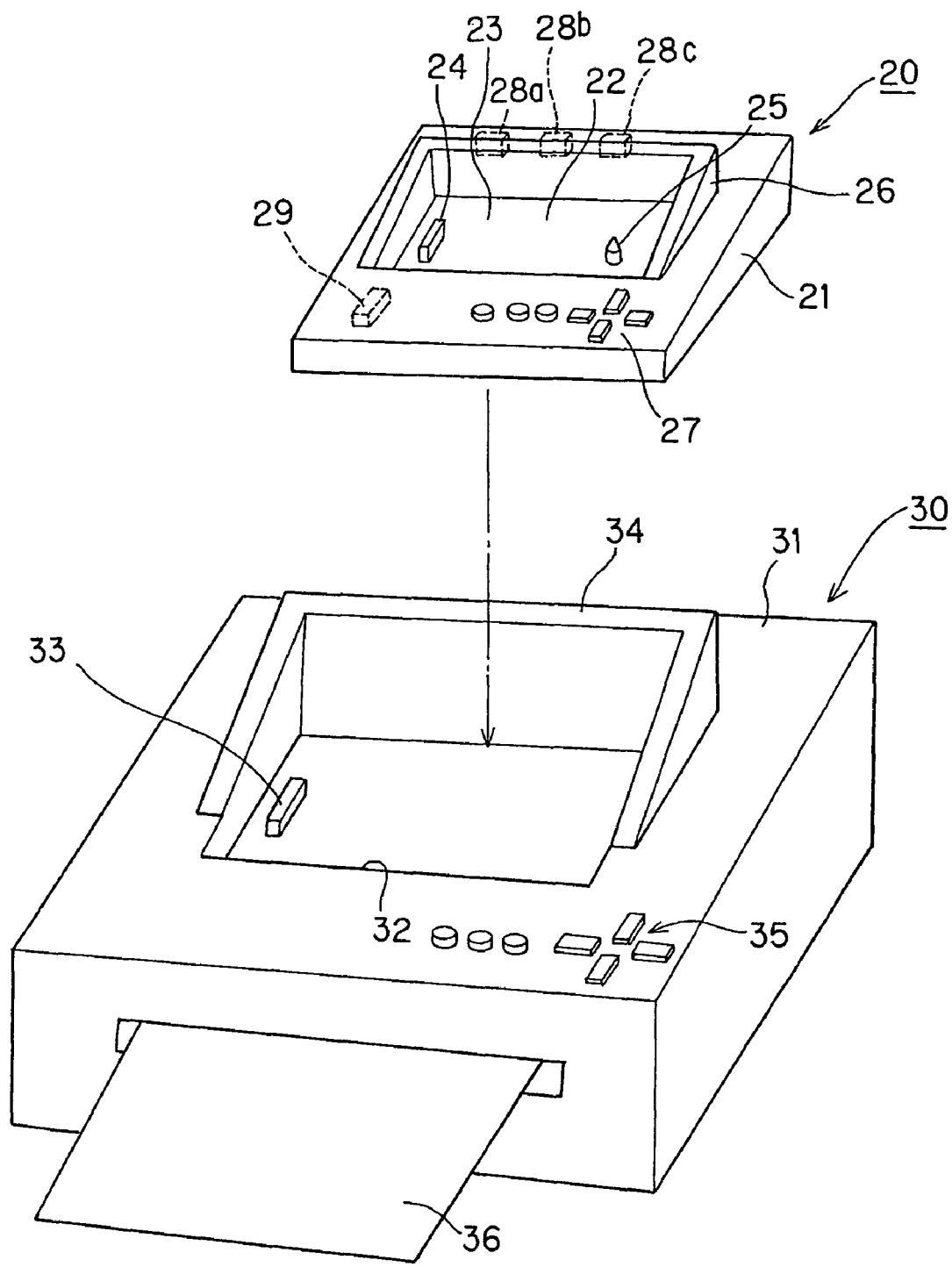
FIG. 3 is a perspective view of the cradle device and a printer device that constitute the printing system.

As shown in FIG. 1 and FIG. 3, in the printer device 30 on which the cradle device 20 is mounted, a cradle mounting section 32 on which the cradle device 20 is mounted, is provided on the upper surface of a hosing 31. The cradle mounting section 32 is constituted by a recess corresponding to the shape of the bottom of the cradle device 20. At the bottom of the cradle mounting section 32, a connector 33 connected to the jack 29 provided at the bottom of the cradle body 21 that constitutes the cradle device 20 is provided. When the digital still camera 10 is mounted on the cradle device 20, the connector 33 supplies a power for charging the digital still camera 10 through the cradle device 20, and receives the image data from the digital still camera 10 through the cradle device 20. Further, the connector 33 inputs an operation signal for operating the digital still camera 10 in the operating unit to the digital still camera 10.

Figure 4:
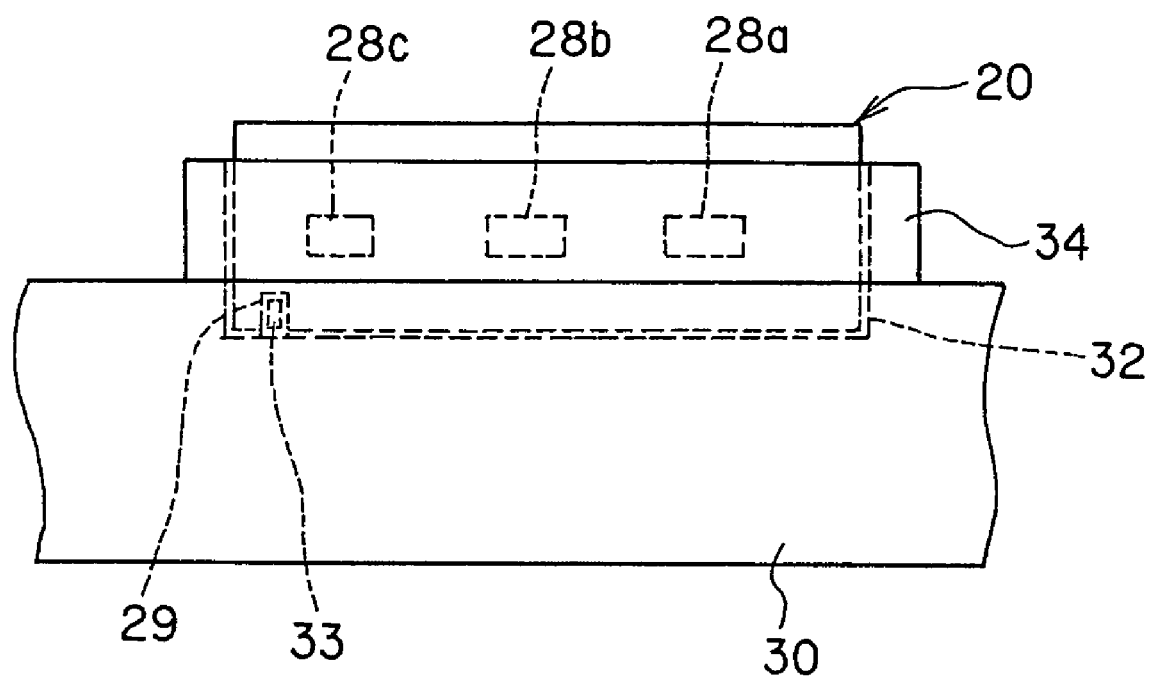
FIG. 4 is a back view of the printer device on which the cradle device is mounted.

On the camera mounting section 22, the cradle device 20 is mounted with the front surface of the cradle device 20 aligned with the front surface side of the housing 31. The first to third jacks 28*a* to 28*c* are provided on the back surface of the cradle body 21 of the cradle device 20. A covering portion 34 which covers the back surface of the cradle body 21 mounted in the cradle mounting section 32 is provided on the back surface side of the cradle mounting section 32. As shown in FIG. 4, the covering portion 34 is formed in size so as to be able to cover at least the first to third jacks 28a to 28c of the back surface of the cradle body 21. In the state that the cradle device 20 is mounted on the cradle mounting section 32, the covering portion 34 conceals the first to third jacks 28a to 28c to improve the appearance. Further, the covering portion 34 prevents dusts, and the like from being adhered to the first to third jacks 28a to 28c.

In order to function the covering portion 34 as a position controlling wall when the cradle device 20 is mounted on the cradle mounting section 32, the covering portion 34 is formed in a substantially U shape so as to cover the back surface of the cradle body 21 and both the side surfaces adjacent to the back surface.

At the front surface side of the cradle mounting section 32 that is the upper surface of the housing 31 for constituting the printer device 30, an operating unit 35 constituted by a plurality of push buttons is provided. When the cradle device 20 is mounted on the cradle mounting section 32 and electrically connected to the cradle mounting section 32, the operating unit 35 can perform a similar operation to the operating unit 15 of the digital still camera 10 or the operating unit 27 of the cradle device 20.

Further, in the printer device 30, a printing section that prints image data on a recording sheet 36 is provided. The printing section is constituted by a recording head for printing, a feeding mechanism for feeding a recording sheet 36, and the like. The printing head is a thermal head for performing thermal recording, an ink jet head for printing with ink, or a laser printer head for performing laser printing. The printing head prints, for example, the image data inputted from the digital still camera 10 through the cradle device 20 on the recording sheet 36.

Moreover, on the printer device 30 as described above, the cradle device 20 on which the digital still camera 10 is mounted, can be mounted on the cradle mounting section 32. At the time, the first to third jacks 28a to 28c provided on the back surface of the cradle device 20 are covered with the covering portion 34, and not exposed. Therefore, the printer device 30 can prevent deterioration of the appearance when the printer device 20 is mounted on the cradle mounting section 32, and prevent dust and the like from being adhered to the first to third jacks 28a to 28c.

In the printer device 30, when the cradle device 20 on which the digital still camera 10 is mounted is mounted on the cradle mounting section 32, the connector 33 is electrically connected to the jack 29 of the cradle device 20. Thus, the image data outputted from the digital still camera 10 is inputted through the cradle device 20. Then, the inputted image data can be printed by the printer device 30. Further, in the state that the cradle device 20 on which the digital still camera 10 is mounted, the printer device 30 can charge the digital still camera 10 through the cradle device 20.

Further, on the printer device 30, the cradle device 20 on which the digital still camera 10 is not mounted, can be mounted. For example, when the cradle device 20 has a memory function for storing image data, the image data stored in the memory is inputted to the printer device 30, and the inputted image data can be printed.

Figure 5:
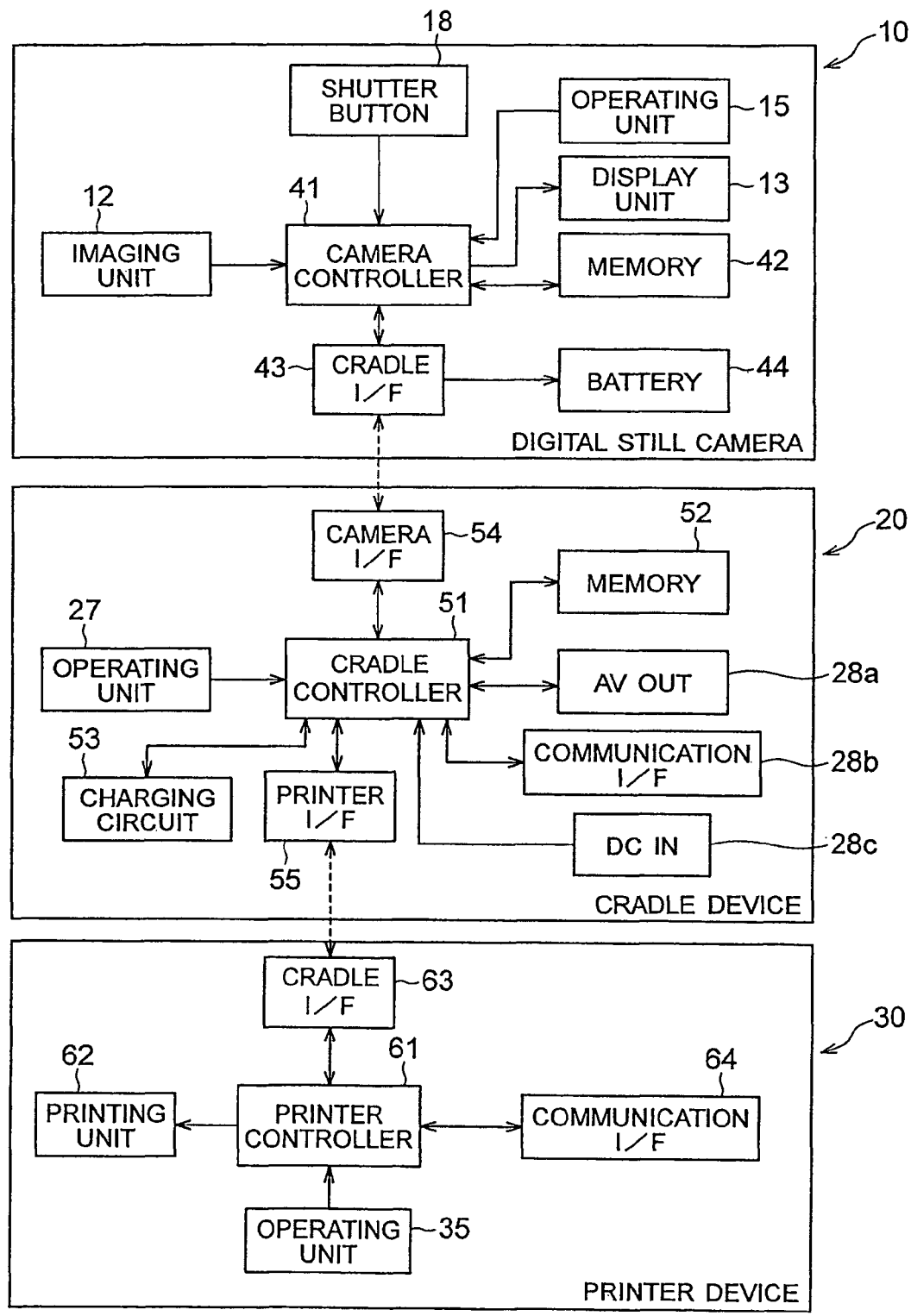
FIG. 5 is a block diagram of the printing system.

The digital still camera 10, the cradle device 20 and the printer device 30 that constitute the printer system 1 as described above, have a circuit configuration as shown in FIG. 5.

More particularly, the above-mentioned digital still camera 10 includes a camera controller 41 which controls the entire digital still camera 10. To the camera controller 41, the above-mentioned imaging unit 12, the display unit 13, the operating unit 15, and the shutter button 18 are electrically connected. Further, a memory 42 for storing the image data photographed by the imaging unit 12, and a cradle interface (hereinafter referred to as a cradle I/F) 43 electrically connected to the cradle device 20 are electrically connected.

The memory 42 is a semiconductor memory built in the camera body 11, an IC card which uses a magnetic disc or a semiconductor memory detachably attached to the camera body 11 as a storage element, an optical disc, a magnetic disc, or the like. The memory 42 stores the photographed image data and the like in such a recording medium.

The cradle I/F 43 is an interface which performs data communication or the like with the cradle device 20. The cradle I/F 43 is provided with the jack 17. Various operation signals are inputted from the cradle device 20 to the digital still camera 10. Additionally, the image data stored in the memory 42 or the operation signal generated in the digital still camera 10 is outputted from the cradle I/F 43. Further, a power for charging the charge type battery 44 of the digital still camera 10 is supplied from the cradle device 20.

In the above-mentioned digital still camera 10, a camera mode and a reproducing mode can be selected by using the operating unit 15. In the case of the camera mode, the image data and the like photographed by the imaging unit 12 can be stored in the memory 42. In the case of the reproducing mode, the image data stored in the memory 42 is outputted to the display unit 13, the monitor or the like connected to the first jack 28a of the cradle device 20. Thus, the image data stored in the memory 42 can be seen. When the digital still camera 10 is mounted on the cradle device 20, the charge type battery 44 can be charged.

Further, the cradle device 20 includes a cradle controller 51 for controlling the entire cradle device 20. In the cradle controller 51, the above-mentioned operating unit 27 and the first to third jacks 28a to 28c are connected. In addition, a memory 52 for storing the image data and the like, a charging circuit 53 for charging the charge type battery 44 of the digital still camera 10, a camera interface (hereinafter referred to as a camera I/F) 54 connected to the cradle I/F 43 of the digital still camera 10, and a printer interface (hereinafter referred to as a printer I/F) 55 electrically connected to the printer device 30 are electrically connected.

The memory 52 is a semiconductor memory built in the cradle body 21, an IC card which uses a magnetic disc or a semiconductor memory detachable from the camera body 11 as a storage element, an optical disc, a magnetic disc, or the like. The memory 52 stores the image data transmitted from the digital still camera 10, or the image data inputted from the other electronic devices the second jack 28b in such a recording medium. In the memory 52, further, the image data received via radio may be stored.

The charging circuit 53 supplies a DC power inputted from the third jack 28c or the printer device 30 to the digital still camera 10 through the camera I/F 54 for charging the charge type battery 44 of the digital still camera 10. Thus, the cradle device 20 can charge the charge type battery 44 when the digital still camera 10 is mounted on the cradle device 20.

The camera I/F 54 is an interface for performing data communication and the like with the digital still camera 10. The connector 24 is connected to the camera I/F 54. Various operation signals and image data from the digital still camera 10 are inputted from the camera I/F 54. Further, the camera I/F 54 supplies the power for charging the charge type battery 44 of the digital still camera 10.

The printer I/F 55 is an interface for performing data communication and the like with the printer device 30. The printer I/F 55 includes the jack 29. The image data or the like for printing is outputted from the printer I/F 55 to the printer device 30. Further, the power for charging the charge type battery 44 of the digital still camera 10 is supplied from the printer I/F 55.

In the cradle device 20 as described above, when the digital still camera 10 is mounted on the cradle device 20, the DC power inputted from the third jack 28c or the printer device 30 is supplied through the coupled cradle I/F 43 and camera I/F 54 to the charge type battery 44 of the digital still camera 10, and the battery 44 can be charged. Further, the cradle device 20 can store the image data inputted through the camera I/F 54 from the digital still camera 10 or the image data inputted from the second jack 28b in the memory 52. Therefore, the cradle device 20 can output the image data stored in the memory 52 for printing from the printer I/F 55 even in the state that the digital still camera 10 is mounted or the state that the digital still camera 10 is not mounted on the cradle device 20.

Further, the printer device 30 includes a printer controller 61 for controlling the entire printer device 30. To the printer controller 61, a printing unit 62 for printing and the operating unit 35 are electrically connected and, a cradle I/F 63 connected to the printer I/F 55 of the cradle device 20, and a communication interface (hereinafter referred to a communication I/F) 64 for connecting with other electronic devices, for example, a personal computer, are electrically connected.

The printing unit 62 is constituted by a recording head for printing, a feeding mechanism for feeding the recording sheet 36, and the like. As the printing head 62, a thermal head for performing thermal recording, an ink jet head for printing with ink, or a laser printer head for performing laser printing is used. The printing head 62 prints the image data inputted from the digital still camera 10 through the cradle device 20 on the recording sheet 36.

The cradle I/F 63 is an interface for performing data communication and the like with the cradle device 20. The cradle I/F 63 includes the connector 33. The image data and the like for printing is inputted to the printer device 30 by the cradle I/F 64. Further, the cradle I/F 63 supplies the power for charging the charge type battery 44 of the digital still camera 10 to the digital still camera 10 through the cradle device 20.

The communication I/F 64 is an interface for performing a wired or radio data communication with other electronic devices, such as a personal computer. For example, the image data transmitted from other electronic devices is received.

In the printer device 30 as described above, when the image data inputted from the memory 42 of the digital still camera 10 through the cradle device 20 or the image data inputted from the memory 52 of the cradle device 20 is received, the received image data can be printed by the printing unit 62. Further, the printer device 30 can supply the power for charging to the digital still camera 10 through the cradle device 20 by mounting the cradle device 20 on which the digital still camera 10 is mounted.

In the printing system 1 as described above, the digital still camera 10 can be mounted on the cradle device 20 and the cradle device 20 can be mounted on the printer device 30 to electrically connect one another. Therefore, when the interface of the shape or the like of the cradle mounting section 32 of the printer device 30 is made common, various digital still cameras 10 can be electrically connected to the printer device 30. The covering portion 34 is provided at the cradle mounting section 32 of the printer device 30 to mount the cradle device 20 on the printer device 30. Thus, the first to third jacks 28a to 28c provided on the back surface of the cradle device 20 are covered with the covering portion 34. Accordingly, it is possible to prevent the appearance from being deteriorated when the cradle device 20 is mounted on the printer device 30.

When the cradle device 20 is mounted on the cradle mounting section 32 of the printer device 30, the first to third jacks 28a to 28c are covered with the covering portion 34, and become unusable. However, the cradle device 20 is electrically connected to the printer device 30. Thus, the interface of the printer device 30 can be used instead of the first to third jack 28a to 28c.

Further, on the cradle device 20, the digital still camera 10 is mounted with the display unit 13 of the back surface as a front surface. Further, the cradle device 20 is mounted on the printer device 30 with the display unit 13 of the digital still camera 10 aligned with the front surface side of the printer device 30. Therefore, the user can easily select image data to be printed while viewing the image displayed on the display unit 13 of the digital still camera 10 by using the operating unit 15 of the digital still camera 10, the operating unit 27 of the cradle device 20 or the operating unit 35 of the printer device 30.

In the printing system 1, the digital still camera 10 is electrically connected to the printer device 30 through the cradle device 20. Even if the digital still camera 10 is not mounted, only the cradle device 20 can be electrically connected to the printer device 30. Thus, the image data stored in the memory 42 of the digital still camera 10 or the image data stored in the memory 52 of the cradle device 20 can be printed by the printer device 30. Thus, the convenience can be improved.

Furthermore, when the digital still camera 10 is mounted on the cradle device 20, and when the cradle device 20 is mounted on the printer device 30, the digital still camera 10 can be charged. Therefore, the convenience can be improved.

Incidentally, the device mounted on the cradle device is not limited to the above-mentioned digital still camera 10. An electronic device such as a video camera may be used as long as the device has a photographing function. Further, the electrical connection of the digital still camera 10 and the cradle device 20 and/or the electrical connection of the cradle device 20 and the printer device 30 may be performed by using a connector and a jack, or when mounted on the mounting section, performed at a contact point where the terminals are contacted with each other.

It should be understood by those skilled in the art that various modifications, combinations, sub-combinations and alterations may occur depending on design requirements and other factors insofar as they are within the scope of the appended claims or the equivalents thereof.

What is claimed is:

1. A printing system, comprising:
a camera having an imaging unit, a memory for storing image data photographed by the imaging unit, and a first operating unit on a surface of the camera for controlling camera functions;
a cradle having a cradle body with a camera mounting section for receiving the camera, the cradle body having an operating surface with a second operating unit, and a plurality of jacks provided on a back surface of the cradle body, the mounted camera being electrically connected to the second operating unit; and
a printer having a cradle mounting section for receiving the cradle and for mechanically and electrically connecting the camera to the printer through the cradle, so that the printer prints the image data, the printer having a third operating unit on a surface of a housing of the printer, wherein when the camera is mounted in the camera mounting section, the second operating unit controls substantially the same camera functions as the first operating unit, wherein the cradle mounting section includes a covering portion for covering the plurality of jacks on the back surface of the cradle body, and wherein when the cradle is mounted in the cradle mounting section, the third operating unit controls substantially the same camera functions as the first operating unit or the second operating unit.

2. The printing system according to claim 1, wherein the cradle has a memory for storing image data.

3. The printing system according to claim 1, wherein the plurality of jacks includes a first jack connected to a display of the camera, a second jack connected to an information processing unit, and a third jack for receiving a DC power.

4. The printing system according to claim 3, further comprising:
a fourth jack provided on a bottom surface of the cradle body, the fourth jack being electrically connected with the printer and the cradle mounting section.

5. The printing system according to claim 1, wherein the camera mounting section includes a supporting piece formed at a back surface of the cradle body for supporting a front surface of the camera.

\* \* \* \* \*